US009787736B2

(12) United States Patent
    Do

(10) Patent No.: US 9,787,736 B2
(45) Date of Patent: Oct. 10, 2017

(54) REDIRECTION APPARATUS AND METHOD

(75) Inventor: Manh-Hung P. Do, Vancouver (CA)

(73) Assignee: Orbital Multi Media Holdings Corporation, Tortola (VG)

( * ) Notice: Subject to any disclaimer, the term of this patent is extended or adjusted under 35 U.S.C. 154(b) by 518 days.

(21) Appl. No.: 13/576,936

(22) PCT Filed: Feb. 3, 2011

(86) PCT No.: PCT/CA2011/000117
§ 371 (c)(1),
(2), (4) Date: Nov. 9, 2012

(87) PCT Pub. No.: WO2011/094844
PCT Pub. Date: Aug. 11, 2011

(65) Prior Publication Data
US 2013/0054756 A1    Feb. 28, 2013

(30) Foreign Application Priority Data
Feb. 3, 2010   (GB) .................................. 1001769.7

(51) Int. Cl.
    G06F 15/16    (2006.01)
    H04L 29/06    (2006.01)
    H04N 21/231   (2011.01)
(52) U.S. Cl.
    CPC ......... H04L 65/4084 (2013.01); H04L 65/80 (2013.01); H04N 21/23103 (2013.01); H04N 21/23116 (2013.01)
(58) Field of Classification Search
    CPC .................................................. H04L 67/1008

USPC .................................................. 709/217, 219
See application file for complete search history.

(56) References Cited

U.S. PATENT DOCUMENTS

| 7,353,277 B1 | 4/2008 | Carney |
| 2001/0027491 A1 | 10/2001 | Terretta et al. |
| 2002/0009079 A1 | 1/2002 | Jungck et al. |
| 2002/0156702 A1 | 10/2002 | Kane |
| 2003/0172163 A1 | 9/2003 | Fujita et al. |
| 2004/0088412 A1* | 5/2004 | John ............ H04L 29/06 709/226 |
| 2007/0061266 A1 | 3/2007 | Moore et al. |
| 2007/0124476 A1* | 5/2007 | Oesterreicher ..... H04L 67/1008 709/226 |
| 2009/0125625 A1 | 5/2009 | Shim et al. |
| 2009/0144284 A1* | 6/2009 | Chatley ............... G06F 3/0613 |
| 2009/0234965 A1 | 9/2009 | Viveganandhan et al. |

(Continued)

FOREIGN PATENT DOCUMENTS

| CA | 2 398 373 A1 | 8/2001 |
| EP | 1 307 018 A1 | 5/2003 |
| EP | 1940109 A2 | 7/2008 |

(Continued)

Primary Examiner — Wing F Chan
Assistant Examiner — Andrew Woo
(74) Attorney, Agent, or Firm — Blank Rome LLP

(57) ABSTRACT

Described embodiments are directed to methods and apparatus for redirecting a client device to a selected streaming server in response to receiving a request for content. The streaming server to which the client is redirected can be selected based on one or more criteria such as streaming server loads (e.g. connection loads and processing loads) and content storage location, using a data structure stored at the redirection server.

54 Claims, 8 Drawing Sheets

(56) References Cited

U.S. PATENT DOCUMENTS

2010/0094963 A1* 4/2010 Zuckerman et al. ......... 709/219

FOREIGN PATENT DOCUMENTS

| EP | 2 043 332 A2 | 4/2009 |
|----|--------------|--------|
| WO | WO 99/06913 A1 | 2/1999 |
| WO | WO 00/14633 A1 | 3/2000 |
| WO | WO 2007/0699151 A1 | 6/2007 |

* cited by examiner

REDIRECTION APPARATUS AND METHOD

FIELD

The invention relates generally to content-request redirection, for instance in a content streaming system such as an IPTV system.

BACKGROUND

Internet Protocol Television (IPTV) is increasingly being deployed and offered as a service for delivering streaming media content over digital networks such as the Internet.

However, delivering high-quality streaming media content presents a number of challenges, due to the divergence between, on the one hand, the often large sizes of media content items and the requirement for continuous data flow, and, on the other hand, the need to conserve network bandwidth.

Content distribution networks (CDNs) provide one way of addressing some of these challenges. Broadly speaking, CDNs consist of edge servers and origin servers. The edge servers, which can store part or all of the content held by the origin servers, distribute content to clients. However, this leads to additional challenges, in particular how best to allocate requests of clients to the edge servers.

Load balancing is a technique that spreads requests across multiple servers, so that no individual server becomes overloaded. Numerous algorithms have been proposed, the simplest of which comprise random allocation, in which any available server is picked randomly from among the servers, and round-robin allocation, in which available servers are picked on a rotating basis. More advanced load balancing schemes also exist, but often these are implemented at the expense of increased complexity.

It would, therefore, be desirable to provide improved techniques of redirecting client requests for content to a server.

SUMMARY

Embodiments described herein are directed to methods and apparatus for redirecting a client device to a selected streaming server in response to receiving a request for content. In general terms, the streaming server to which the client is redirected can be selected based on one or more criteria such as streaming server loads (e.g. connection loads and processing loads) and content storage location, using a data structure that stores such information.

In one embodiment, there is provided an apparatus for redirecting a client device to one of a plurality of streaming servers of a system configured to store content in a plurality of hierarchical storage layers, the apparatus comprising a data structure configured to store and associate streaming server identifiers, storage layer identifiers, and identifiers of the content residing in the storage layers, wherein a higher storage layer of the hierarchy provides faster content access times than the content access times provided by a lower storage layer; selecting means configured to select a streaming server from among the plurality of streaming servers using the data structure, in response to receiving a request for content from the client device, wherein the selecting includes determining the highest storage layer from which the requested content is available; and communication means configured to receive the request and to send to the client device a reply including the identifier of the selected streaming server.

Storage layers can be delineated by differences such as, but not limited to, storage media technology (e.g. cache, high- and low-performance disk drives, magnetic tapes) and/or storage location (e.g. streaming server, Storage Area Network). Maintaining information about the content stored in hierarchical storage layers (in which content can be moved between layers) means that content can be efficiently stored and distributed across different locations and/or different storage media technologies, without compromising on access to the content. For example, content which is most frequently requested can be placed in a higher storage layer, while content which is expected to be infrequently accessed can be stored in a lower storage layer.

In one embodiment, the selecting means is configured to instruct the selected streaming server to fetch the requested content from a storage server of the system, in response to determining that the highest storage layer from which the requested content is available is not associated with one of the streaming servers. Thus, when the requested content is not stored at any of the streaming servers (or the streaming server(s) storing the requested content has no capacity), the apparatus can instruct a streaming server to retrieve the content from e.g. a Storage Area Network (SAN). However, it will be appreciated that embodiments enable the elimination of the SAN altogether, and storing content just on the streaming servers.

In one embodiment, the apparatus is configured to receive from each of the plurality of streaming servers a message including information indicating the content currently being stored. This enables the apparatus to keep informed of where content is stored. Streaming servers may be associated with more than one storage layer. For example, content may be stored in Random Access Memory (RAM) ("Layer 1") and hard disk drive ("Layer 2") at the streaming servers. Thus, in one embodiment, the information included in the message indicates the storage layers corresponding to the stored content. In one embodiment, the apparatus is configured to update the data structure based on the information included in the message. In one embodiment, the message is received periodically.

In one embodiment, the plurality of hierarchical storage layers comprises a first storage layer having the fastest content access times among the storage layers (e.g. cached at a streaming server), a second storage layer having the slowest content access times among the storage layers (e.g. stored at the SAN), and at least one third storage layer having content access times intermediate to the first and second storage layers (e.g. stored on hard disk at a streaming server).

In one embodiment, the data structure is further configured to store and associate the streaming server identifiers with data representing streaming server loads for each of the streaming servers, and wherein the determining includes identifying one or more streaming servers having capacity to handle the request (e.g. the streaming server with the lowest load). In one embodiment, the data representing streaming server loads comprises at least one of processing loads and connection loads.

In one embodiment, the data structure is further configured to store and associate the content identifiers with file type identifiers, each of the file type identifiers corresponding to a one of a plurality of different streaming server loads. For example, different file types may be associated with different screen aspect ratios and/or video bit rates. Streaming servers may be dedicated to one content type or may serve different content types.

In one embodiment, there is provided a method of redirecting a client device to one of a plurality of streaming servers of a system configured to store content in a plurality of hierarchical storage layers, the method comprising storing and associating, in a data structure, streaming server identifiers, storage layer identifiers, and identifiers of the content residing in the storage layers, wherein a higher storage layer of the hierarchy provides faster content access times than the content access times provided by a lower storage layer; receiving a request for content from the client device; selecting a streaming server from among the plurality of streaming servers using the data structure in response to receiving the request, the selecting including determining the highest storage layer from which the requested content is available; and sending to the client device a reply including the identifier of the selected streaming server.

In one embodiment, the method further comprises instructing the selected streaming server to fetch the requested content from a storage server of the system, in response to determining that the highest content storage layer from which the requested content is available is not associated with one of the streaming servers.

In one embodiment, the method further comprises receiving from each of the plurality of streaming servers a message including information indicating the content currently being stored. In one embodiment, the information further includes information indicating the storage layers corresponding to the content if the streaming server from which the message is received is associated with more than one storage layer. In one embodiment, the method further comprises updating the data structure based on the information included in the message. In one embodiment, the method further comprises receiving the message periodically.

In one embodiment, the method further comprises storing and associating the streaming server identifiers with data representing streaming server loads for each of the streaming servers, and wherein the determining includes identifying one or more streaming servers having capacity to handle the request. In one embodiment, the method further comprises storing and associating the with file type identifiers in the data structure, each of the file type identifiers corresponding to a different streaming server load.

In one embodiment, there is provided an apparatus for redirecting a client device to a streaming server of a system including a plurality of streaming servers configured to store content, the apparatus comprising a data structure configured to store and associate streaming server identifiers with data representing streaming server toads for each of the streaming servers, the data comprising a current load and a load limit for each of the streaming servers; selecting means configured to select a streaming server from among the plurality of streaming servers using the data structure, in response to receiving from the client device a request that identifies the content and a type of said content, the type corresponding to one of a plurality of different loads, wherein the selecting includes identifying any streaming server having capacity to handle the request; and communication means configured to receive the request and to send to the client device a reply including the identifier of the selected streaming server.

Typically, different types of content make different load demands on the streaming servers. For example, streaming content to a set-top box connected to a large display can require more resources than streaming the corresponding content to a mobile device having a small display. In order to efficiently utilise streaming server resources, it is advantageous to know which type of content is required. Thus, the redirection server can calculate the available capacity of the streaming servers in a straightforward manner. The available capacity may be determined as an amount or a percentage, for example.

In one embodiment, the type is identified by a type identifier that is specific to the type. In one embodiment, the type identifier is associated with one or more of screen aspect ratio and video bit rate.

In one embodiment, the data structure is further configured to store and associate the streaming server identifiers with identifiers of the content residing at the streaming servers, the selecting means further configured to identify any streaming server storing the requested content. Thus, a range of files, categorized according to type, can be stored. This is advantageous because it obviates the need for the streaming server to dynamically encode the available contents to the different types of client players, thus reducing processing load.

In one embodiment, the apparatus is configured to update the current load for the selected streaming server in the data structure responsive to the selection.

In one embodiment, the apparatus is configured to receive from each of the plurality of streaming servers a message including information indicating the current load, and to update the corresponding current load in the data structure based on the information.

In one embodiment, the apparatus the connection load limit is based on a benchmarked load. The benchmark connection load can be obtained in respect of each client device that it is expected to handle. Thus, streaming servers can be added to the system as required enabling straightforward scalability of resources.

In one embodiment, there is provided a method of redirecting a client device to a streaming server of a system including a plurality of streaming servers configured to store content, the method comprising storing and associating streaming server identifiers with data representing streaming server loads for each of the streaming servers in a data structure, the data comprising a current load and a load limit for each of the streaming servers; receiving from the client device a request that identifies content and a type of said content, the type corresponding to one of a plurality of different streaming server loads; selecting a streaming server from among the plurality of streaming servers using the data structure, including identifying any streaming server having capacity to handle the request; and sending to the client device a reply including the identifier of the selected streaming server.

In one embodiment, the data structure is further configured to store and associate the streaming server identifiers with identifiers of the content residing at the streaming servers, the selecting further including identifying any streaming server storing the requested content.

In one embodiment, the method further comprises updating the current load for the selected streaming server in the data structure responsive to the selection.

In one embodiment, the method further comprising receiving from each of the plurality of streaming servers a message including information indicating the current load, and updating the corresponding current data in the data structure based on the information.

In one embodiment, there is provided an apparatus for redirecting a client to a streaming server in a system having a plurality of streaming servers, the apparatus comprising data storage means configured to store and associate streaming server identifiers with data representing streaming server loads for each streaming server; selecting means configured to select a streaming server identifier from among the streaming server identifiers based on the streaming server loads, in response to receiving from the client a request for content; and communication means configured to receive the request and to send to the client a reply including the selected streaming server identifier.

Storing and associating streaming server identifiers with server loads facilitates straightforward and quick load balancing.

In one embodiment, the streaming server loads comprise at least one of processing loads (e.g. CPU usage) and connection loads (e.g. a current number of open connections).

In one embodiment, the data storage means is configured to store and associate cached content identifiers with the streaming server identifiers. This allows the selecting to be performed based on where content is cached. Content that is cached on streaming servers can be delivered expeditiously to clients.

In one embodiment, where the loads comprise at least connection loads, the data storage is configured to associate the connection loads with combinations of streaming server identifiers and cached content identifiers. This ensures that, where multiple streaming servers are delivering the same cached content, requests can be redirected to a most suitable and efficient streaming server for minimal delay to the client.

In one embodiment, the selecting means is configured to update the streaming server load data stored in the data storage means in response to the selecting of the streaming server identifier. Thus, the apparatus can maintain up-to-date information between periodic reports from the streaming servers and continue to provide effective redirecting. Furthermore, when a streaming server becomes unavailable it can be removed from further consideration.

In one embodiment, the streaming server load data is updated according to a calculated load value that is a function of processing load and connection load, for example comprising a processing load component, a connection load component, and a connection load to processing load ratio component. In this way, the processing load and connection load can be are weighted such that each load type is assigned a relative importance.

In one embodiment, the apparatus includes mapping means configured to map the request for content to one or more streaming server identifiers, from which to the streaming server identifier is selected. This allows various service provides and resellers to limit access to their clients, e.g. subscribers.

In one embodiment, the storage means is configured to store and associate client identifiers with selected streaming server identifiers. Thus, if a client-server session is interrupted, for example where the server becomes unavailable, the apparatus can ensure that the client is redirected to a different server caching the same content that was being delivered.

In one embodiment, there is provided a method for redirecting a client to a streaming server in a system having a plurality of streaming servers, the method comprising storing and associating streaming server identifiers with data representing streaming server loads for each streaming server; receiving from the client a request for content; selecting a streaming server identifier from among the streaming server identifiers based on the streaming server loads, in response to the receiving; and sending to the client a reply including the selected streaming server identifier.

In one embodiment, there is provided a client for receiving streaming content over a network from a streaming server, the client comprising communication means configured to send a request for content to a redirection apparatus, and to receive a reply including a selected streaming server identifier; and session establishment means configured to establish a streaming content session with the selected streaming server identifier.

In one embodiment, there is provided a system comprising at least one aforementioned apparatus for redirecting clients to streaming servers; and a plurality of streaming servers each configured to retrieve and/or store content for streaming to clients.

In one embodiment, the system comprises two redirecting apparatus configured for synchronisation with one another and sharing an identifier.

In one embodiment, there is provided a system comprising a plurality of first apparatus for redirecting clients to streaming server in accordance with any one of the paragraphs above; and a second apparatus for redirecting a client to one of the first apparatus; wherein the second apparatus includes data storage means configured to store and associate first apparatus identifiers, streaming server identifiers, streaming server loads, and content identifiers; selecting means configured to select a first apparatus identifier from among the plurality of first apparatus identifiers based on a comparison between an identifier of the client and the first apparatus identifiers, in response to receiving from the client a request for content; and communication means configured to receive the request and to send to the client a reply including the selected first apparatus identifier.

As used herein the term 'client' refers to a computer's general role as a requester of 'content', which refers to audio, video, graphics files (in uncompressed or compressed format), icons, software, text files and scripts, data, binary files and other computer-usable data used to operate a client and produce desired audio-visual effects on the client for a viewer. Thus a client can comprise a computer apparatus configured in accordance with software.

As used herein the term 'streaming server' refers to a computer's general role as a provider of content in the form of a stream of packets. It will be understood that terms such as 'a server' or 'a streaming server' do not exclude the possibility of the provision of more than one of these modules. For example, a server may be a set of servers in a cluster that can be presented as a single server or "virtual" server to the client. Thus a server can comprise a computer apparatus configured in accordance with software.

As used herein the term 'load' broadly relates to how much of a server's resources are being utilized.

The present invention and any of its embodiments can be implemented by software on a general purpose computer or in a combination of software and hardware. Thus any of the 'means' defined above can be implemented as code modules in any combination in a computer.

In one embodiment of the invention there is provided a computer program product which may be embodied in a passive storage medium, and which configures a computer to perform a method defined in any one of the paragraphs above. Here, the term computer may encompass a computer with dedicated hardware.

Aspects of the invention may be provided in the form of a computer program product on a carrier medium, which may be embodied in a passive storage medium such as an optical or magnetic medium, or in an electronic medium such as a mass storage device (e.g. a FLASH memory), or in a hardware device implemented to achieve execution of instructions in accordance with the invention, such as ASIC, an FPGA, a DSP or the like. Alternatively the carrier medium can comprise a signal carrying the computer program code such as an optical signal, an electrical signal, an electromagnetic signal, an acoustic signal or a magnetic signal. For example, the signal can comprise a TCP/IP signal carrying the code over the Internet.

BRIEF DESCRIPTION OF THE DRAWINGS

Various embodiments are described in detail below with reference to accompanying drawings, in which.

While multiple embodiments are disclosed herein, still other embodiments will become apparent to those skilled in the art from the following detailed description, which describes illustrative embodiments. As will be realized by those of ordinary skill in the art upon reading the following disclosure, embodiments are capable of modifications in various aspects, all without departing from the spirit and scope of the present invention as defined in the appended claims. Accordingly, the drawings and detailed description are to be regarded as illustrative in nature and not restrictive.

DETAILED DESCRIPTION OF EMBODIMENTS

Figure 1:
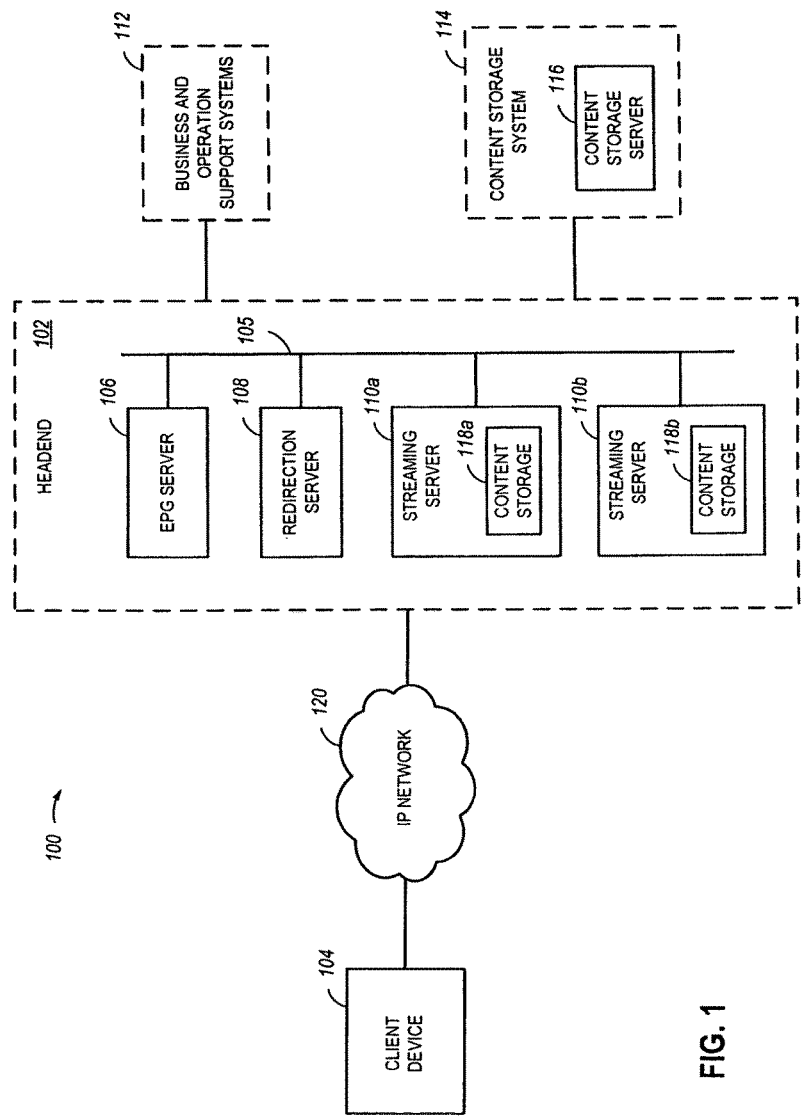
FIG. 1 is a simplified network diagram of a system for delivering content to a client according to an embodiment.

FIG. 1 is a simplified network diagram of an exemplary system 100 for delivering streaming media content to a client, such as an IPTV system that can support Video on Demand (VOD), Live TV, and Pay-Per-View (PPV).

The system 100 comprises a headend 102 for delivering content to client device 104 over a network 120. The headend 102 includes an Electronic Program Guide (EPG) server 106, a redirection server 108, and one or more streaming servers 110a, 110b, which are connected through an Ethernet or other communication network 105.

The headend 102 is also connected to backend business and operation support systems 112. These provide functionalities such as billing and customer management, authentication, authorization and accounting (AAA), and system management including performance analysis.

The EPG server 106 is a portal of IPTV service, providing information to the client 104 in the form of an on-screen guide for example. This allows a user to navigate, select and search for content by time, title, live channel and the like.

A redirection server 108 selects a streaming server to handle a content request in accordance with one or more criteria, exemplary ones of which will be described in due course. Broadly speaking, the redirection server 108 can distinguish between different content requests, thereby enabling the distribution of load according to content availability at (and performance capabilities of) the streaming servers 110a, 110b.

The redirection server 108 supports control protocols such as the Real Time Streaming Protocol (RTSP), which functions as a 'network remote control' for regulating access to content by redirecting the client 104 to a streaming server. The redirection server may also include preventive measures to guard against attacks from outside the system.

Requested content, such as video, is delivered by a streaming server 110a, 110b to the client device using a data protocol such as MPEG-4 (H.264), ISMA/MPEG-2 TS, or RTSP/RTCP/RTP/SDP, over IP-network 120. Typically, each server can provide between 1,000 and 10,000 concurrent streams of high-resolution video application.

Content is provided to the streaming servers 110a, 110b from a content storage system 114 comprising content storage servers 116. An exemplary content storage system is a Storage Area Network (SAN). Content can be selectively stored at the streaming servers in different types of storage media 118a, 118b, for example in cache or on disk.

Figure 2:
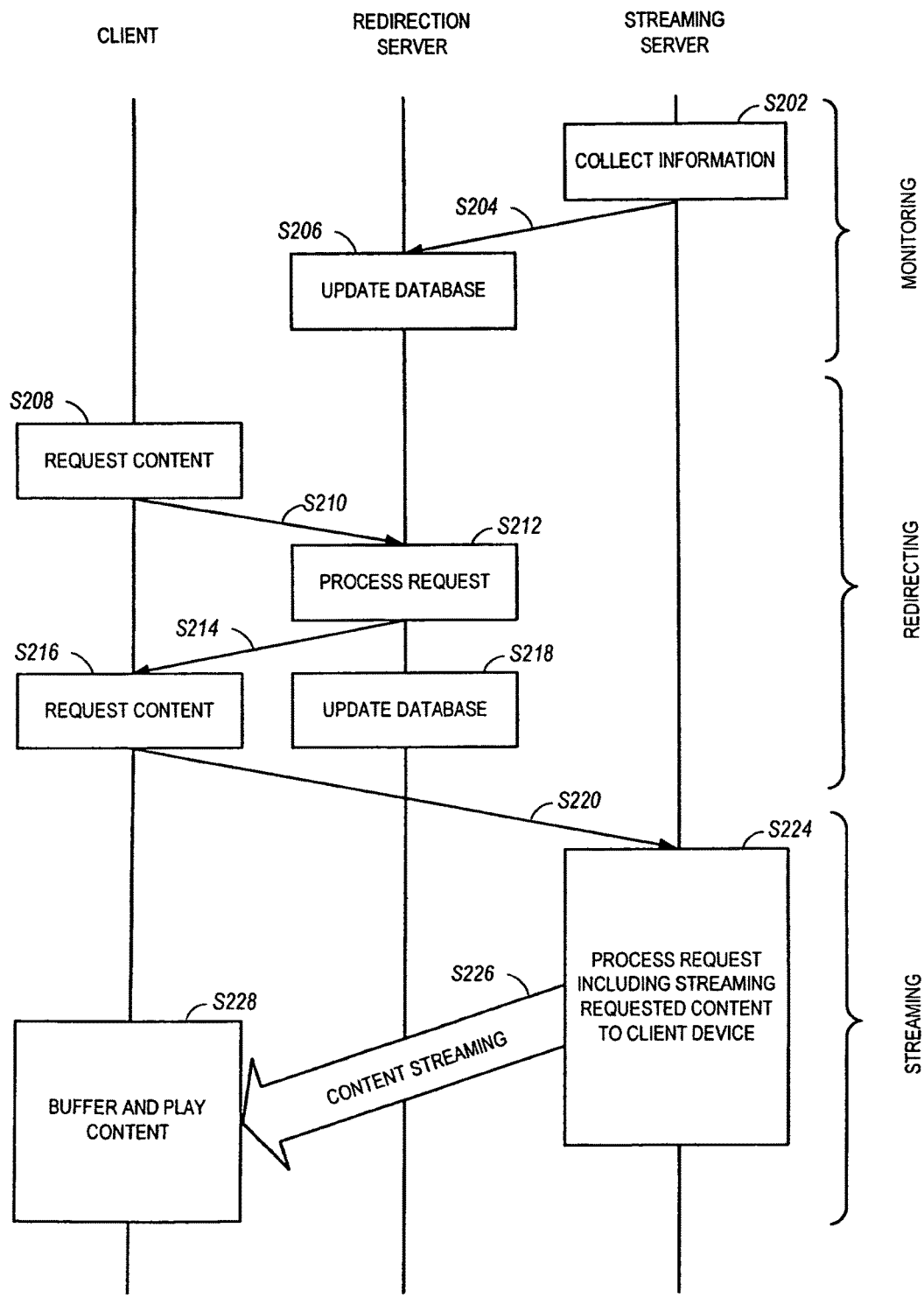
FIG. 2 is a sequence diagram illustrating operating processes that can be implemented by the system shown in FIG. 1.

FIG. 2 is a sequence diagram illustrating operating processes that can be implemented by the system 100 shown in FIG. 1. The processes include a monitoring process, a redirecting process and streaming process.

The monitoring process is a process in which an agent on the streaming server collects load and real-time content play information (step S202) that is then fed back to the redirection server (step S204). The redirection server then uses this information to update its database (step S206). The monitoring process may be performed periodically, for example every two seconds.

In the redirecting process, the client initiates an RTSP request for a conversation with a streaming server (step S208), in response to selection of content by a client user. The request is sent, with the help of Doman Name System (DNS) resolution for example, to the redirection server for processing (step S210).

At step S212, the received request is processed by the redirection server. Request processing can include an authentication step for authenticating the client device using its MAC address for example. In its simplest form, the system is specific to a particular service provider or reseller, so that, in principle, clients have access to all streaming servers. Alternatively, the system can be shared between two or more service providers or resellers. In such cases, the client can be mapped to specific content and/or specific streaming server(s) related to a particular service provider or reseller.

The redirection server then selects a suitable streaming server in accordance with the stored information and using one or more criteria.

An identifier of the selected streaming server is then sent to the client (step S214), for example using the RTSP 'REDIRECT' (3XX) command. The identifier can be contained in a 'Location' field of the redirection server's response message. The redirection server updates its database (step S218) to maintain its effectiveness until the next periodic feedback is received from the streaming servers.

After obtaining the redirection message, the client then sends the request for the content to the indicated streaming server (step S216).

The streaming server finds the required content, which can be stored locally or requested from a remote storage system, and streams the content to the client (steps S224 and S226), where it is buffered and played (step S228). The client device can pause, rewind or fast forward the content, by sending the corresponding request using RTSP. During the streaming process (streaming session), there is generally no further communication with the redirection server.

Various streaming server selection methods will now be described.

Selection Based on Content Storage Layers

In one embodiment, the redirection server stores content identifiers, streaming server identifiers and storage layer identifiers. This can be in the form of a data structure such as the table shown below. The content identifiers comprise 32-bit Cyclic Redundancy Check (crc32) values, e.g., movie file names. Using crc32 instead of a name string saves memory and accelerates the searching process. The streaming server identifiers comprise IP address:port tuples. The storage layer identifiers may comprise numerical values, for example a first numerical value corresponding to a first storage layer such as local cache, a second numerical value corresponding to a second storage layer such as local disk, and a third numerical value corresponding to a third storage layer such as the SAN. Thus, in some cases content identifiers may not be associated with any streaming server; that is, the corresponding content is not stored at a streaming server but at the SAN.

TABLE 1

Storage layer table

| Content identifier (CRC32) | Storage Layer | Streaming server identifier (IP) |
|---|---|---|
| 425342673 [KingKong.mp4] | 1 (Local cache) | 192.168.1.4 |
| | 2 (Local disk) | 192.168.1.5 |
| 440360780 [KungFu.mp4] | 1 (Local cache) | 192.168.1.5 |
| 2873221646 [Transformers.mp4] | 1 (Local cache) | 192.168.1.6 |
| 2336068251 [Terminator.mp4] | 3 (SAN) | — |

Figure 3:
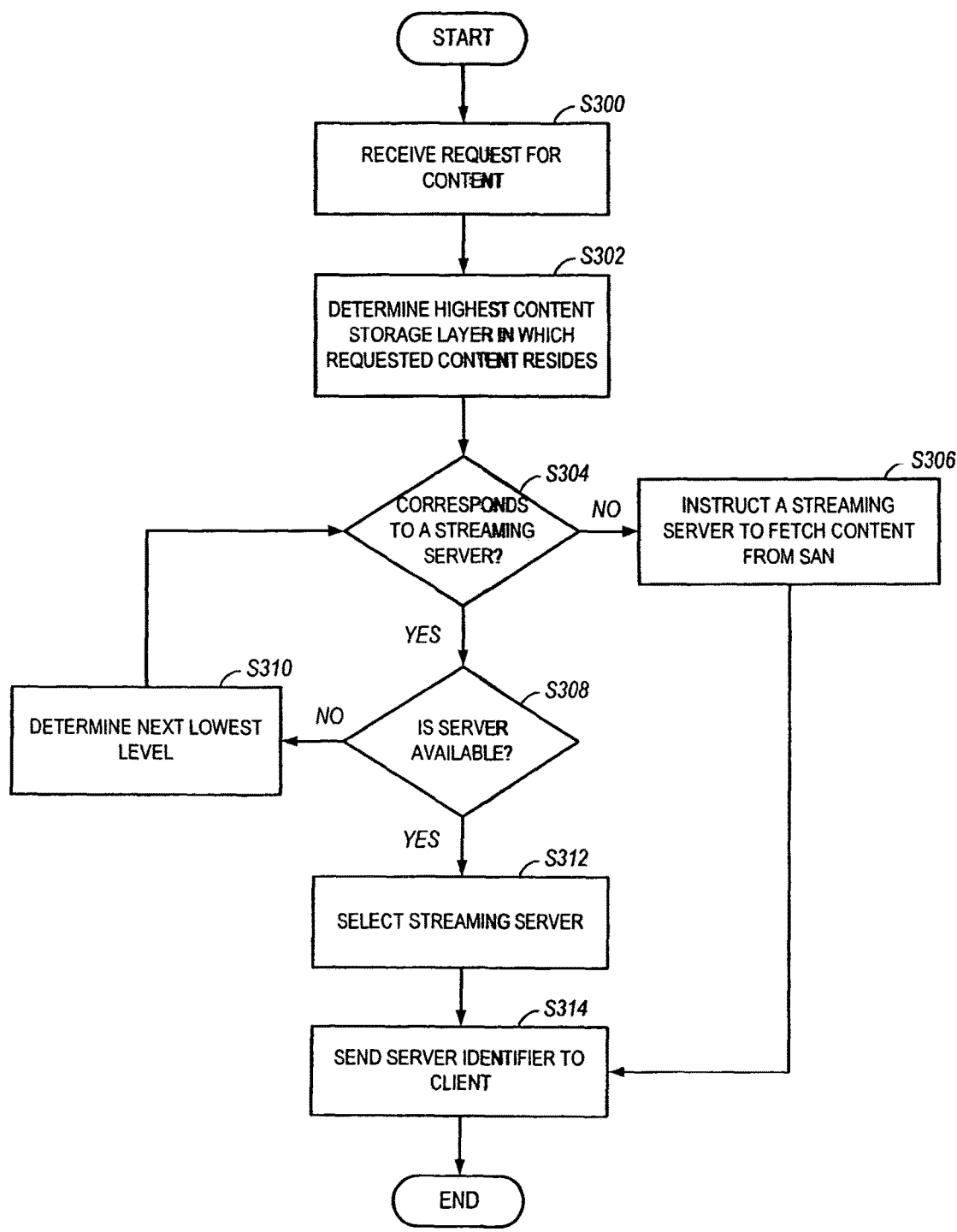
FIG. 3 is a flow diagram showing how a streaming server can be selected according to content storage level information according to an embodiment.

FIG. 3 is a flow diagram showing how a streaming server can be selected using the exemplary data structure that has just been described. At step S300, the redirection server receives a request for content from the client device. At step S302, the redirection server determines the highest storage layer in which the content resides (i.e. in cache, on disk or at the SAN). If the highest storage layer does not correspond to a streaming server, e.g. the requested content is available only at the SAN (step S304, 'NO'), then one of the servers is instructed to fetch the content from the SAN for streaming to the client device. The identifier of that streaming server is then sent to the client device (step S314). If the content is resides on at least one of the streaming servers (step S304, 'YES'), and one of these streaming servers has capacity to handle the request (step S308, 'YES'), then it is selected (step S312) and the streaming server identifier is sent to the client device (step S314). If none of the streaming servers are associated with the highest content storage layer (step S308, 'NO'), then the next lowest content storage layer is determined at step S310 and the process repeats. For example, if all of the streaming servers that are caching the requested content are at full capacity, then a streaming server storing the requested content at a lower storage level can be identified. If no suitable streaming servers are found then an error message can be returned to the client device. One example of how to determine whether or not a streaming server is suitable is described later.

It will be appreciated that other sequences of steps are possible. For example, it is possible to first determine the available streaming servers among the plurality of servers (e.g. based on data representing server loads) and then determine whether any of the available streaming servers store the requested content.

Selection Based on File Types

Streaming servers may serve a range of heterogeneous client devices, such as portable devices and set-top boxes. Generally, such client devices have different playback characteristics (i.e. limitations). These can include, but are not limited to, frame size/resolution (width×height), display frame rate, used codec (H.264), Group of Picture (GOP) size, GOP structure, output aspect ratio (e.g. 4:3 or 16:9) and bit rate (e.g. kilobits or megabits per second). For example, the higher the resolution and bit rate (which specify the number of pixels available in a specific frame and how much actual information is being used to generate those pixels), the better the quality of the resulting video—a high-resolution video with a low bit-rate will produce a more blurry image as well as visible signs of "artifacting" (distortion, blocking effects and jagged edges) on high-motion action sequences. There are generally limits to the screen resolution and video bit rates that can be used on each device. This results in different loads on the streaming servers. The number of connections that streaming servers can handle may be determined through benchmark testing and can take into account processing load and/or connection load. For example, a streaming server may be able to concurrently handle 10,000 connections being served content of a first type, 1,000 connections being server content of a second type, or a mixture of the two.

Figure 4:
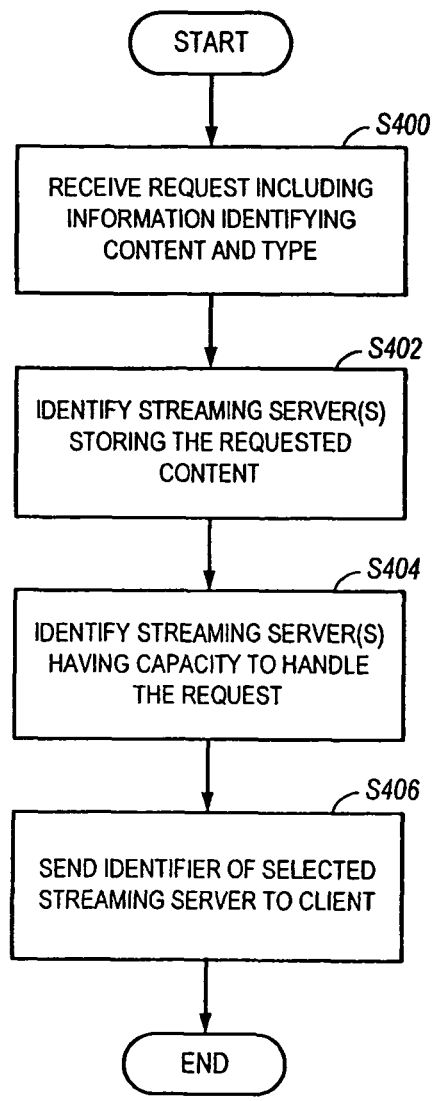
FIG. 4 is a flow diagram showing how a streaming server can be selected according to connection load information according to an embodiment.

Accordingly, in one embodiment, the redirection server stores streaming server load data for each of the streaming servers. This can be processing load and/or connection load. FIG. 4 is a flow diagram showing how a streaming server can be selected based on this data. At step S400, the redirection server receives a request from the client device that includes information identifying the desired content and the content type. For example, the request may be for standard definition or high definition. At steps S402 and S404, the redirection server identifies a streaming server storing the requested content and having capacity to handle the request. For example, continuing the example above, a streaming server handling 4,000 connections of the first type and 100 connections of the second type will be operating at about 50% capacity. At step S406, the identifier of the selected streaming server is sent to the client device.

In one embodiment, a range of files categorised according to type can be stored. In other words, the source content can be encoded at different screen resolutions and video bit rates (or any other playback characteristics) that are supported by different client devices. For example, content for playback on a portable device may be limited to a native resolution of 320×240, and so streaming content at a higher resolution would not be an efficient use of resources (though some portable devices have the capability of outputting video content to a higher-resolution display). Thus, the information contained in the request may include content type information (e.g. a "code") enabling identification of the content type, and step S402 may include identifying the correct file for the client device.

Selection Based on Streaming Server Loads

In one embodiment, processing and connection loads are used in the selection of a streaming server. The information stored at the redirection device is stored in the form of two tables: a Forward Strategy Table (FST) and a VOD Server Table (VST), examples of which are shown below. It will be understood by the skilled reader that the terms used here, including 'FST', 'VST', 'movie' and 'VOD Server', are merely descriptive and used without implying any loss of generality.

TABLE 3

Forward Strategy Table (FST)

| Content identifier (CRC32) | Connection load (open connections) | Streaming server identifier (IP:Port) |
| --- | --- | --- |
| 425342673 [KingKong.mp4] | 300 | 192.168.1.4:554 |
| | 3 | 192.168.1.5:554 |
| 440360780 [KungFu.mp4] | 100 | 192.168.1.5:554 |
| 2873221646 [Transformers.mp4] | 10 | 192.168.1.6:554 |
| 2336068251[Terminator.mp4] | 20 | 192.168.1.6:554 |

TABLE 4

VOD Server Table (VST)

| Streaming server identifier (IP:Port) | Processing load | Total connection load (total open connections) |
| --- | --- | --- |
| 192.168.1.6:554 | 5 | 30 |
| 192.168.1.5:554 | 20 | 103 |
| 192.168.1.4:554 | 60 | 300 |

The FST stores content identifiers, connection load values (the number of open connections being supported by each streaming server for respective content), and streaming server identifiers.

As before, the content identifiers may comprise 32-bit Cyclic Redundancy Check (crc32) values, and the streaming server identifiers comprise IP address:port tuples.

Thus, it is readily apparent that there are 300 open connections to streaming server '192.168.1.4:554' for '425342673' ('King Kong'), but only 3 open connections to streaming server '192.168.1.5:554' for the same content.

The number of open connections can be determined from the feedback information received from the streaming server; estimated from the redirects issued by the redirection server, or a combination of both.

The VST stores streaming server identifiers, together with associated processing load and total connection load information. The latter can simply be calculated as a sum of all the FST connection load entries for a given streaming server identifier.

To ensure that the FST and VST accurately reflect the system status, the following rules can be implemented:
1. Update VST and FST in accordance with the feedback received from the streaming servers. The feedback can include information related to each VST/FST entry, that is, processing load, connection load, content identifiers and streaming server identifiers.
2. Remove the VST entry for a streaming server when the redirection server doesn't receive one or more of its periodic feedback. This ensures that no client is redirected to a streaming server that is 'dead'.
3. Remove the VST entry for a streaming server when its periodic feedback indicates that it has become unavailable. This ensures that no client device will be redirected to a streaming server which can't provide services.

These rules are particularly effective when content caching is enabled at the streaming servers (though it is generally applicable to cases where content is stored at the streaming servers in other kinds of storage medium), which is the technique of storing content in a cache so that when content is requested it is fetched from the cache instead of the backend storage system. The delivery of cached content results in a faster response and reduces upstream bandwidth consumption.

Figure 5:
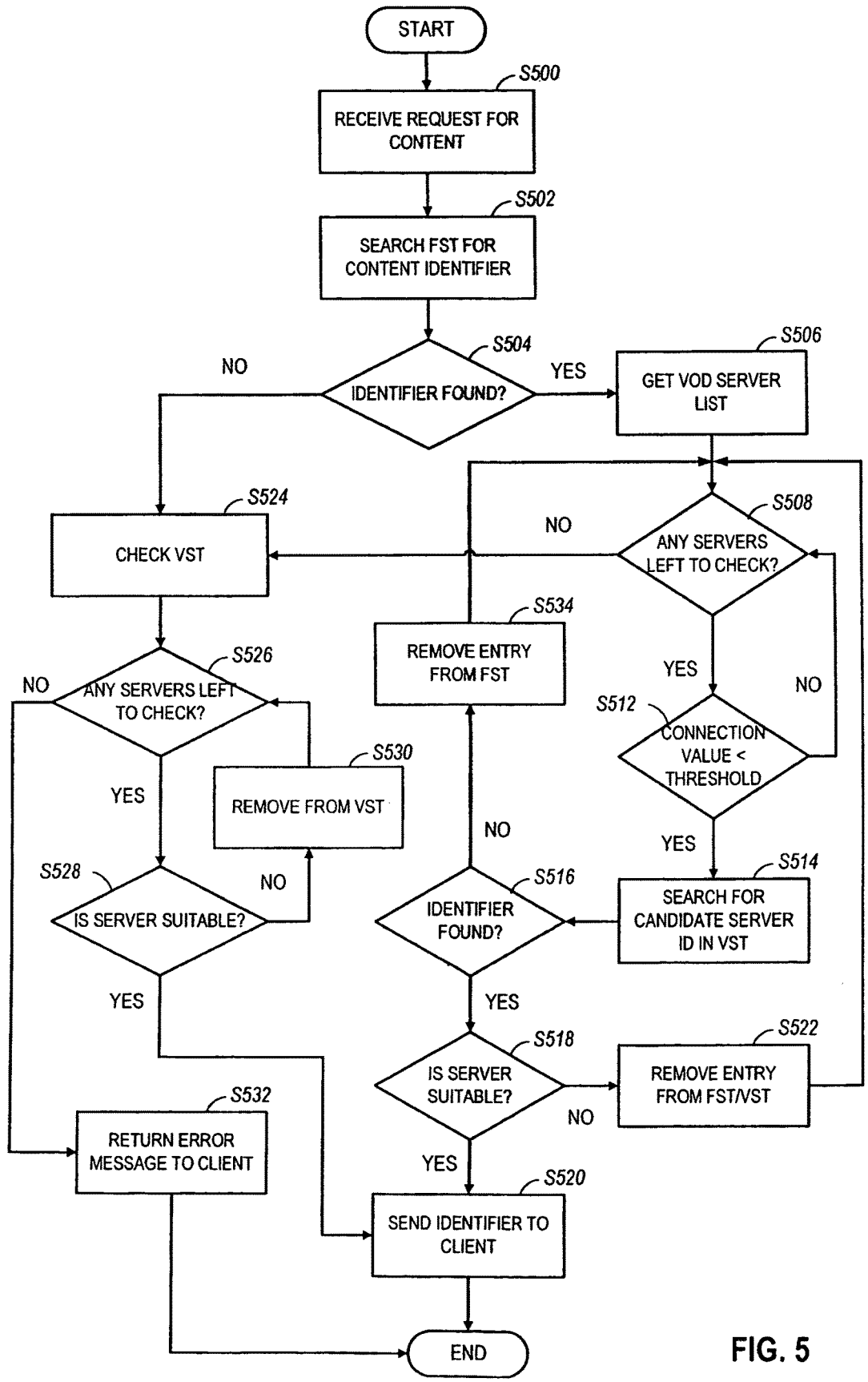
FIG. 5 is a flow diagram showing how load balancing rules can be implemented at the redirection server according to an embodiment.

FIG. 5 is a flow diagram showing how the aforementioned rules can be implemented in the context of content caching, for improved load balancing.

When a new content request, e.g. for the movie King Kong, is received (step S600), the redirection server searches the FST for "kingkong.mp4" using the crc32 value (step S502). If the content identifier is found (step S504 'YES'), the set of VOD servers currently caching that content is determined, by looking up the associated streaming server identifier(s) in the FST. In this case, the VOD server identifiers '192.168.1.4:554' and '192.168.1.5:554' are found.

In this way, the redirection server can ascertain whether requested content is, in theory, immediately available to the client device.

An assessment of a streaming server's suitability is then made by comparing its associated connection load value to a threshold, e.g. 500. A suitable candidate could be any streaming server having connection load that is less than the threshold. Thus, a check for the most suitable candidate could be performed, which is the candidate satisfying the threshold criteria and having the lowest connection load. Alternatively, the streaming servers could be checked sequentially until a suitable candidate is found. In either case, streaming servers having an open connection load greater than the threshold (step S512 'NO') are ignored. The checking can continue until no more streaming servers are left (step S508 'NO').

Once a suitable candidate (or the most suitable candidate, as the case may be) is found, a search in the VST for its identifier is performed (step S514).

If the identifier is found (step S516 'YES'), a further assessment is made as to its suitability (step S518), based on the associated processing load information. If it is suitable (step S518 'YES'), the streaming server identifier is sent to the client (step S520). At the same time, the FST and VST are updated to take account of the redirection.

If at step S518 it is determined that the streaming server is not suitable (step S518 'NO'), it is removed from the FST and VST (step S522) and the process returns to step S508. Step S508 is also reached if, at step S516, the server identifier is not found in the VST (step S516 'NO'), in which case the corresponding entry is deleted from the FST (step S534).

Thus, even when content is known to be cached, the step of checking the associated connection load ensures that streaming servers are not overloaded, thereby ensuring effective load balancing.

If all VOD servers in the FST list are exhausted (step S508 'NO') without a suitable candidate having been found, the process advances to step S524, which begins the process of determining a suitable VOD server from the VST whose processing load is the lowest. Step S524 is also reached if, at step S504, the content identifier is not found in the FST, which indicates that the requested content is not cached at any of the streaming servers.

As before, a search for a suitable candidate is performed, which can be the streaming server having the lowest processing load. Another criterion may include server location relative to the client. If a suitable streaming server is found (step S528 'YES'), its identifier is sent to the client (step S520). Once again, the FST and VST are updated accordingly. Otherwise (step S528 'NO'), the server is removed from the VST (step S530) and a check for further candidates is performed (step S526). If no streaming servers are available (step S526 'NO'), an error message is returned to the client (step S532) indicating that there is no available streaming server at present.

Where a sudden surge in content requests occurs within a short period of time, e.g. 1000 requests within 2 seconds, a modified approach can be taken in which scaled loads of the streaming servers are considered.

In particular, subsequent to redirecting a client to a server, the scaled load for the selected streaming server is given as:

$$l = (w_1 \times L) + (w_2 \times C) \quad \text{(Eq. 1)}$$

where
l is the scaled load of the streaming server;
L is the processing load of the streaming server;
C is the total connection load, taken from the VST table; and
$w_1$ and $w_2$ are weight factors.

The values of $w_1$ and $w_2$ can be determined through benchmark testing of the streaming servers, and are defined as:

$$w_1 + w_2 = 1 \quad \text{(Eq. 2)}$$

The two weights determine the relative priority given to processing load and connection load. Thus, if $w_1$ is greater than $w_2$, greater priority is given to processing load, and vice versa. Typical weight values are 0.4 for $w_1$ and 0.6 for $w_2$, although it will be appreciated these can vary between streaming servers.

The processing load of a streaming server can be defined as:

$$L = [(L_{15} \times 0.1) + (L_{10} \times 0.3) + (L_5 \times 0.6)] \times 100 \times R \quad \text{(Eq. 3)}$$

where:
$L_{15}$ is the processing load of the streaming server over the last 15 minutes;
$L_{10}$ is the processing load of the streaming server over the last 10 minutes;
$L_5$ is the processing load of the streaming server for the last 5 minutes; and
R is a ratio value.

The weight values 0.1, 0.3 and 0.6 are typical values determined by benchmark testing each streaming server in the system, and can vary accordingly.

The ratio value R is defined as:

$$R = \frac{C_{max}}{L_{max}} \quad \text{(Eq. 4)}$$

where:
$C_{max}$ is the maximum number of concurrent connections that the streaming server can support.
$L_{max}$ is the processing load of the streaming server at $C_{max}$.

Again, $C_{max}$ and $L_{max}$ can be obtained through benchmark testing.

Using these equations, improved load balancing performance can be achieved as follows:

1. Update the VST/FST after receiving periodic information from the streaming servers, and sort the VST according to load in ascending order;
2. When a client request arrives, the most suitable streaming server according to the FST and/or VST is selected. The entries for connection load in the VST and FST are increased by one for the selected streaming server and requested content;
3. Update the processing load entry for that streaming server in the VST in accordance with Equation 1, then sort the VST in ascending order. It will be apparent that an increase in the number of connections will cause the scaled load to increase. In this way, the streaming servers having lower loads will be higher up the sorted VST, so that these can be selected in response to a subsequent client request;
4. When the next periodic information from the streaming servers is received, the corresponding entries are updated unconditionally. This ensures that the VST accurately reflects the actual load of the streaming server.

Figure 6:
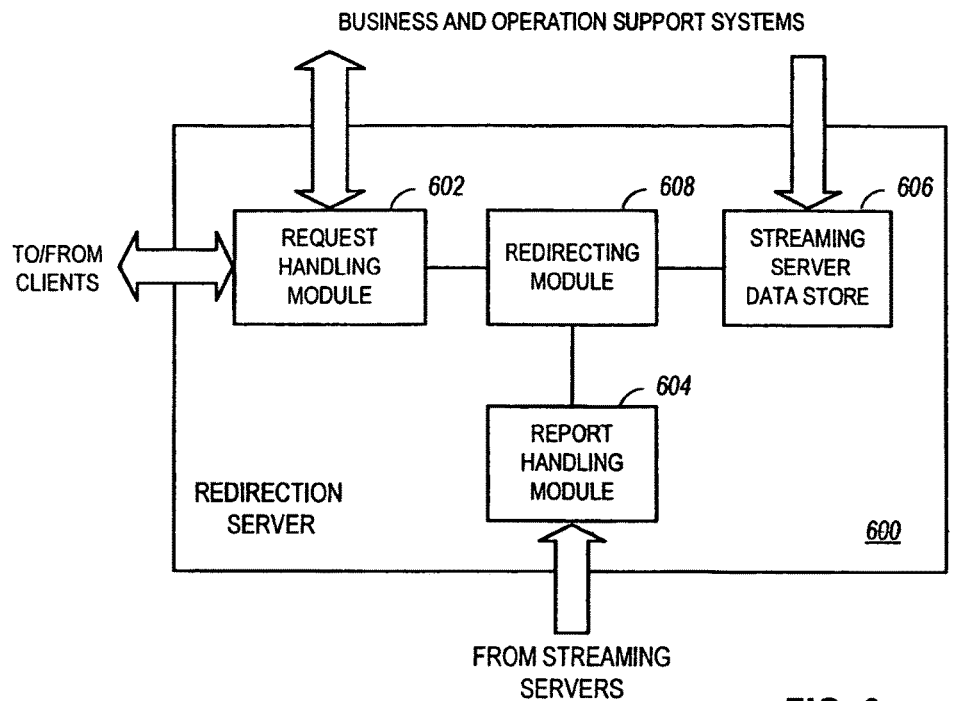
FIG. 6 is a schematic illustration of a redirection server according to an embodiment.

FIG. 6 is a schematic illustration of a redirection server 600 for implementing the above techniques.

The server 600 comprises a request handling module 602, a report handling module 604, a streaming server data store 606 and a redirecting module 608. The request handling module 602 is responsible for dealing with client requests for content and can authenticate clients either by contacting the business and operation support systems or using information stored at the server (not shown). Client requests can also be forwarded to the business and operation support systems for billing purposes.

The request handling module 602 can also map clients to streaming servers belonging to particular content providers or resellers, again by contacting the business and operation support systems or by using information stored at the server.

The report handling module 604 receives feedback from the streaming servers, and provides these to the redirecting module 608 so that the streaming server data store 606 can be updated accordingly. The redirecting module 608 is also configured to perform the methods described above. The data store 606 can also be updated manually, for example when new streaming servers are added to the network.

Figure 7:
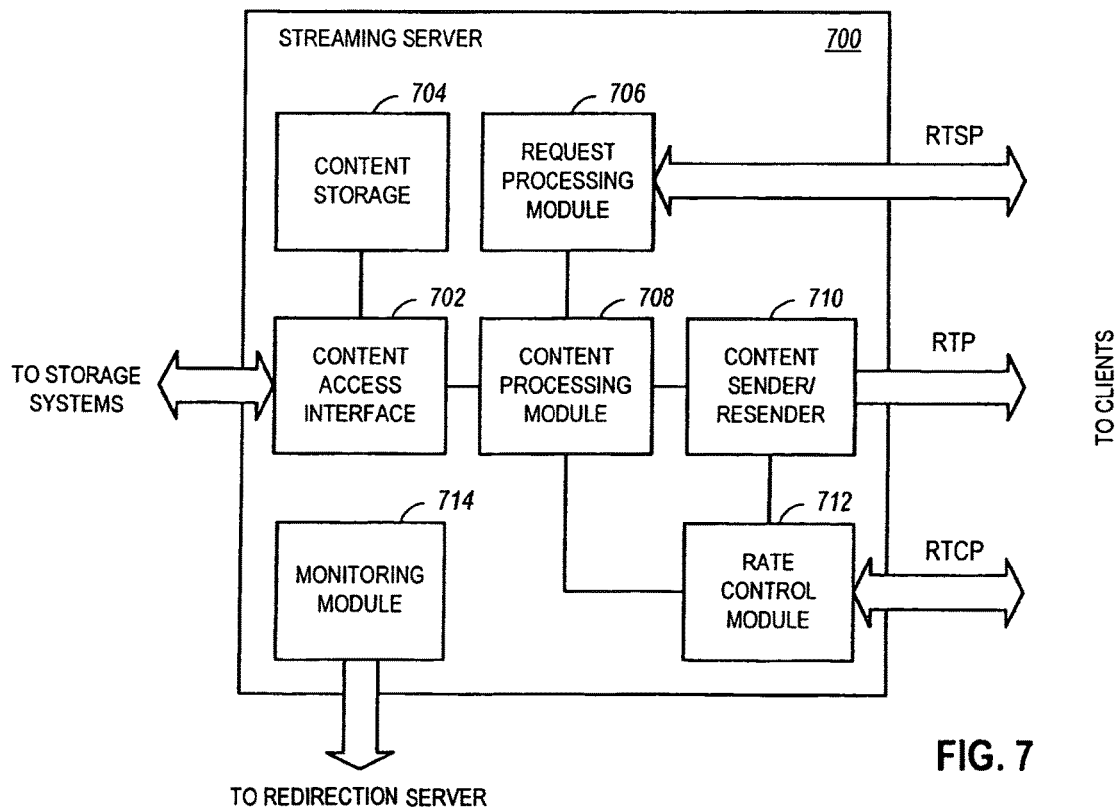
FIG. 7 shows a schematic illustration of a streaming server according to an embodiment.

FIG. 7 shows a schematic illustration of a streaming server 700.

The streaming server 700 includes a content access interface 702 to allow access to content residing on the content storage systems over a high-bandwidth I/O channel, or content stored at the server in cache 704. A request processor 706 receives the requests from the clients, and which are delivered to content processor 708 for processing. Content sender/resender 710 transmits and, where necessary, retransmits (portions of) content to the clients over a network. Feedback from the clients can be received by rate controller 712 to control the rate of content delivery according to network conditions. Exemplary protocols for controlling and transporting the requested content include the Real-time Transport Protocol (RTP), the Real-Time Control Protocol (RTCP), and the Real-Time Streaming Protocol (RTSP).

The performance of the streaming server is monitored by monitoring module 714, which periodically sends reports to the redirection server. The monitoring module 714 may also be configured to inform the redirection server when the streaming server is going to be taken offline for upgrades. In one embodiment, a streaming server operator uses a web administration interface to set the status to "disabled". This causes monitoring module 714 to issue a "disabled" status message to the redirection server. When the redirection server receives this message it changes the server status to "unavailable". Thus, when a client device requests content it will not be directed to that particular streaming server. However, to prevent existing users from being dropped, the streaming server taken offline will keep the current connections that it is serving open in order to maintain a good user experience. After all of the open connections are closed by the clients on that server, the operator can be informed accordingly and safely stop the server and upgrade it. After the update is complete, monitoring module can issue a start-up command to the redirection server thus being informed that the server is once again available.

Figure 8:
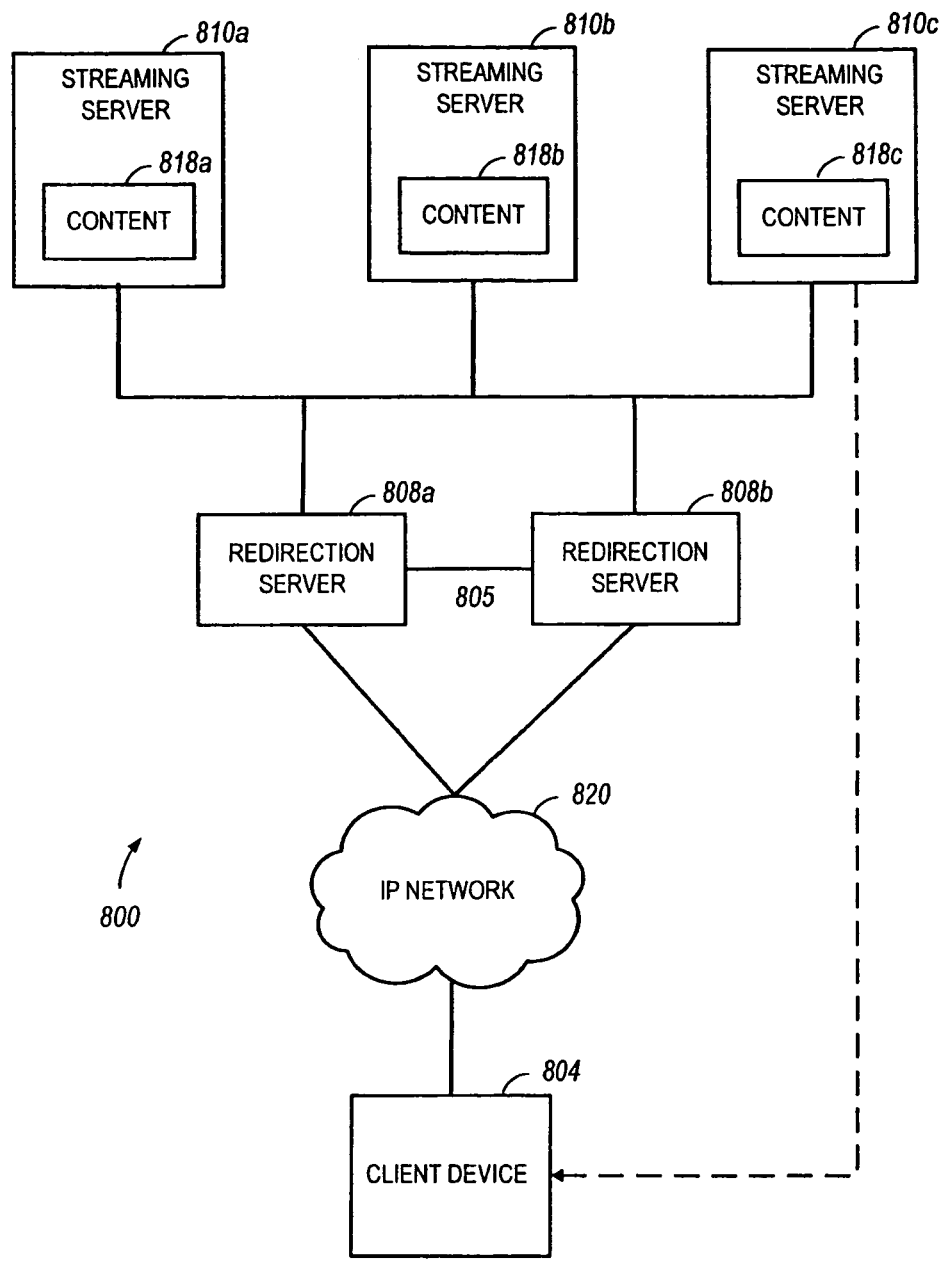
FIG. 8 is simplified network diagram of a system for delivering content to a client according to an embodiment.

FIG. 8 is a simplified network diagram of another system 800 for delivering streaming media content to a client. For clarity, some components shown in FIG. 1 are not shown in FIG. 8.

In this particular configuration, a pair of redirection servers 808a, 808b is employed for added redundancy. The redirection servers are coupled together over a communication link 805 such as a serial connection. In one embodiment, servers 808a, 808b share one virtual IP address so that the client 804 does not need to distinguish between servers. Whichever redirection server assumes the virtual IP address can be designated as a master. Thus, one of the redirection servers may be identified to the streaming servers as an active server and the other server as a back-up server. If the active server fails, then the back-up redirection server can assume its duties.

Here, the streaming servers 810a, 810b, 810c each include a software agent that has knowledge of the IP address (e.g. LAN IP address) allocated to that streaming server. In one embodiment, the software agent reports FST and VST information to both redirection servers to ensure that they have the same FST and VST information. In another embodiment, the software agent does not report this information to the backup server, and sends a status request to the active server and awaits a response therefrom. If no response is received within a specified time period the software agent can resend the status request. If no response is received within multiple time intervals the software agent assumes that the active server is no longer active and begins a server switching procedure. During the server switching procedure, the software agent designates the backup server as the active server and sends the FST and VST information thereto. The software agent may also continue to resend status requests to the (former) active server, thereby enabling it to confirm that it is active once again. In one embodiment, during the server switching procedure the software agent first sends a status request to the backup server in order to verify that it is active.

Figure 9:
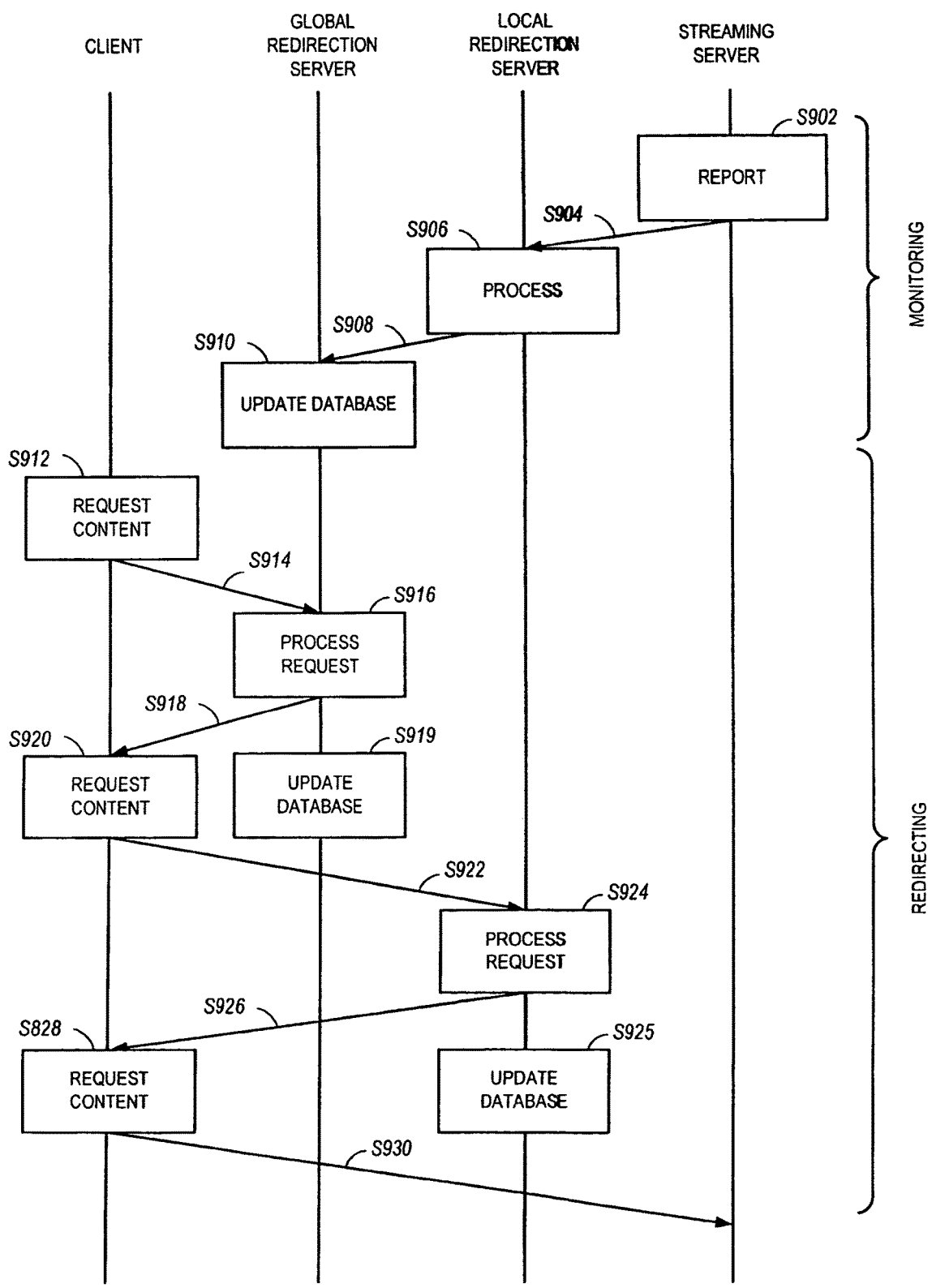
FIG. 9 is a sequence diagram illustrating operating processes that can be implemented by a system for delivering content to a client according to an embodiment.

FIG. 9 is a sequence diagram illustrating operating processes that can be implemented according to another system.

In this system, global redirecting is provided to cope with clients who are geographically distributed across different areas/cities. The basic redirecting principles explained above apply equally here.

The processes include a monitoring process, a redirecting process and streaming process (not shown for clarity). At steps S902 and S904 streaming servers collect load content information (e.g. and real-time content play information) and transmit this information to one or more associated local redirection servers. At step S906, this information is processed and at step S908 sent to a global redirection server (together with their own address information). The redirection server then uses this information to update its database (step S910).

In the redirecting process, the client converses first with the global redirection server (steps S912 to S918) and then with the local redirection server to which it is redirected (steps S920 to S926). Global and local redirection servers update their databases accordingly (steps S919 and S925). These steps are similar to those described with reference to FIG. 2.

The process by which a global redirection server selects a local redirection server is achieved according to the IP address of the client and the IP address of the local redirection servers. By comparing client and local redirection server IP addresses, the global redirection server can select the closest local redirection server for the client.

For example, if the client's IP address is "192.168.1.6", and three local redirection servers have IP addresses "192.168.1.9", "192.168.2.9", and "192.167.1.9", an absolute value according to ($IP_{client}-IP_{local\ redirection\ server}$) is calculated, yielding values of "3", "13" and "97", respectively. Thus, in this case, the first IP address (192.168.1.9) is considered to corresponding to the closest local redirection server, and will be selected for the client. By shortening the delivery path, quality and server consumption are optimized.

At steps S928 and S930, the client device processes the received information and issues content request to the selected streaming server. During this process, the client device does not communicate with the local or global redirection servers.

It will be understood that the principles described with reference to FIGS. 1 to 7 can also be used in the embodiments described with reference to FIGS. 8 and 9.

It will also be understood that various alternatives may be possible to the foregoing embodiments. For example, although server loads are defined in terms of processor utilization and current connections, other load metrics may be used, including processor queue lengths, input output (I/O) throughput, memory utilization, storage usage, disk activity and so on.

While the described methods and apparatus can provide particular advantages to IPTV-type system, they are also applicable to other content delivery systems, for example web server systems. Thus, the client need not be a set-top box, and other embodiments including desktop computers, laptops, handheld computing devices, mobile phones, games consoles and digital recording devices are also contemplated.

Embodiments of the redirection server may communicate with the client using wireless (Wi-Fi, WiMAX, satellite) or wired technology (telephone lines/fiber optic lines), or a combination of the two technologies. Thus, the communication means can be any one or more elements suitable for operating using such technologies.

The data storage means can be any suitable memory such as dynamic or static random access memory (RAM), read only memory (ROM), cache and the like, storing information in the form of lists, reports or any other suitable arrangement. Thus, although the use of two tables (FST and VST) can provide particular advantages, it is not limited to these exemplary structures.

The selecting means can include any or a combination of discrete electronic components, discrete logic circuit(s) having logic gates for implementing logic functions upon data signals, an application specific integrated circuit having appropriate logic gates, a programmable gate array(s) (PGA), a field programmable gate array (FPGA), and so on.

Although in foregoing embodiments the redirection server responds with a reply including the identifier of the selected streaming server, in other embodiments the redirection server forwards the request to the selected streaming server, which then streams the content to the client device. In such an embodiment, the redirection server need not reply to the client device, which can retransmit the request if it is not contacted by a streaming server.

In the detailed description above, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. In particular, although the different selection methods have been described individually, it will be appreciated that they can be combined in different ways. For example, the method of determining a streaming server based on load, as described with reference to FIG. 4, may include, for example at step S402, a determination of the highest content storage level in which the requested content resides. Similarly, the method of determining a streaming server based on storage levels, as described with reference to FIG. 3, may include, for example as part of step S308, a determination as to whether the streaming server has available capacity. Similarly, the method of described with reference to FIG. 5 may include one or more steps of the method described with reference to FIGS. 3 and 4. For example, the request received at step S500 may include information identifying the type of content, in which case step S502 may include searching for the corresponding file and step S512 may include determining that the streaming server has available capacity for that type of content. Likewise, a search for the content identifier at step S504 may include searching according to the storage levels.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Further, in describing representative embodiment of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by those skilled in the art in light of the teachings and guidance.

The breadth and scope of the present invention should not be limited by any of the above-described specific embodiments, and it will be apparent to a skilled person in the art that modifications lie within the spirit and scope of the appended claims.

The invention claimed is:

1. A redirection server for redirecting a client device to one of a plurality of streaming servers of a system configured to store content in a plurality of hierarchical storage layers, the redirection server comprising:
   a memory storing a data structure for storing and associating streaming server identifiers with storage layer identifiers and identifiers of the content residing in the plurality of hierarchical storage layers, wherein a higher storage layer of the plurality of hierarchical storage layers identifies a storage location providing faster content access times than the content access times provided by the storage location identified by a lower storage layer of the plurality of hierarchical storage layers, and wherein the data structure is configured to store and associate the streaming server identifiers with data representing streaming server loads for each of the plurality of streaming servers;
   selecting means configured to select a streaming server from among the plurality of streaming servers using said data structure, in response to receiving a request for content from the client device, wherein the selecting includes:
   identifying one or more streaming servers of the plurality of streaming servers having capacity to handle said request based on the data representing streaming server loads for each of the plurality of streaming servers, and determining the highest storage layer of the plurality of hierarchical storage layers from which the requested content is available and selecting an available streaming server of the plurality of streaming servers having the capacity to handle said request and having the requested content in said highest storage layer of the plurality of hierarchical storage layers; wherein if none of the available streaming servers of the plurality of streaming servers are associated with the highest storage layer of the plurality of hierarchical storage layers, then the selecting further includes determining the next lowest storage layer of the plurality of hierarchical storage layers and selecting an available streaming server of the plurality of streaming servers having the requested content in said next lowest layer of the plurality of hierarchical storage layers; and
   communication means configured to receive said request and to send to the client device a reply including the identifier of the selected streaming server of the plurality of streaming servers.

2. A redirection server according to claim 1, wherein the selecting means is configured to instruct the selected streaming server of the plurality of streaming servers to fetch the requested content from a storage server of the system, in response to determining that said highest storage layer of the plurality of hierarchical storage layers from which the requested content is available is not associated with one of the plurality of streaming servers.

3. A redirection server according to claim 1, wherein the redirection server is configured to receive from each of the plurality of streaming servers a message including information indicating the content currently being stored.

4. A redirection server according to claim 3, wherein said information further includes information indicating the storage layers of the plurality of hierarchical storage layers corresponding to said content if the streaming server from which the message is received is associated with more than one storage layer of the plurality of hierarchical storage layers.

5. A redirection server according to claim 3, wherein the redirection server is configured to update the data structure based on the information included in said message.

6. A redirection server according to claim 3, wherein said message is received periodically.

7. A redirection server according to claim 1, wherein the plurality of hierarchical storage layers comprises a first storage layer having the fastest content access times among the plurality of hierarchical storage layers, a second storage layer having the slowest content access times among the plurality of hierarchical storage layers, and at least one third storage layer having content access times intermediate to the first and second storage layers.

8. A redirection server according to claim 1, wherein said data structure is further configured to store and associate the content identifiers with file type identifiers, each of the file type identifiers corresponding to one of a plurality of different streaming server loads.

9. A redirection server according to claim 1, wherein said data representing streaming server loads comprises at least one of processing loads and connection loads.

10. A method of redirecting a client device to one of a plurality of streaming servers of a system configured to store content in a plurality of hierarchical storage layers, the method being implemented in a redirection server and comprising the steps of:
storing and associating, in a memory storing a data structure on the redirection server, streaming server identifiers, storage layer identifiers, and identifiers of the content residing in the plurality of hierarchical storage layers, wherein a higher storage layer of the plurality of hierarchical storage layers identifies a storage location providing faster content access times than the content access times provided by a lower storage layer of the plurality of hierarchical storage layers, wherein the streaming server identifiers are stored and associated with data representing streaming server loads for each of the plurality of streaming servers;
receiving a request for content from the client device;
selecting a streaming server from among the plurality of streaming servers using said data structure in response to receiving said request, the selecting including identifying one or more streaming servers of the plurality of streaming servers having capacity to handle said request based on the data representing streaming server loads for each of the plurality of streaming servers, and determining the highest storage layer of the plurality of hierarchical storage layers from which the requested content is available and selecting an available streaming server of the plurality of streaming servers having the capacity to handle said request and having the requested content in said highest storage layer of the plurality of hierarchical storage layers; wherein if none of the available streaming servers of the plurality of streaming servers are associated with the highest storage layer of the plurality of hierarchical storage layers, then the selecting further includes determining the next lowest storage layer of the plurality of hierarchical storage layers and selecting an available streaming server of the plurality of streaming servers having the requested content in said next lowest layer of the plurality of hierarchical storage layers; and
sending to the client device a reply including the identifier of the selected streaming server of the plurality of streaming servers.

11. A method according to claim 10, further comprising instructing the selected streaming server of the plurality of streaming servers to fetch the requested content from a storage server of the system, in response to determining that said highest content storage layer of the plurality of hierarchical storage layers from which the requested content is available is not associated with one of the plurality of streaming servers.

12. A method according to claim 10, further comprising receiving from each of the plurality of streaming servers a message including information indicating the content currently being stored.

13. A method according to claim 12, wherein said information further includes information indicating the storage layers of the plurality of hierarchical storage layers corresponding to said content if the streaming server from which the message is received is associated with more than one storage layer of the plurality of hierarchical storage layers.

14. A method according to claim 12, further comprising updating the data structure based on the information included in said message.

15. A method according to claim 12, wherein said message is received periodically.

16. A method according to claim 10, wherein the plurality of hierarchical storage layers comprises a first storage layer having the fastest content access times among the plurality of hierarchical storage layers, a second storage layer having the slowest content access times among the plurality of hierarchical storage layers, and at least one third storage layer having content access times intermediate to the first and second storage layers.

17. A method according to claim10, further comprising storing and associating the content identifiers with file type identifiers in said data structure, each of the file type identifiers corresponding to a different streaming server load.

18. A method according to claim 10, wherein said data representing streaming server loads comprises at least one of processing loads and connection loads.

19. A redirection server for redirecting a client device to a streaming server of a system including a plurality of streaming servers configured to store content, the redirection server comprising:
a monitoring agent for periodically monitoring the plurality of streaming servers;
a memory storing a data structure for storing and associating streaming server identifiers with data representing streaming server loads including a connection load and a processing load for each of the plurality of streaming servers, said connection load being a number of open connections being supported by each streaming server of the plurality of streaming servers for respective content and said processing load being CPU usage for each streaming server of the plurality of streaming servers, wherein said data comprises a current load and a load limit for each of said streaming servers of the plurality of streaming servers, wherein said data structure is further configured to store and associate said streaming server identifiers with identifiers of the content residing at the plurality of streaming servers;

selecting means configured to identify any streaming server of the plurality of streaming servers storing the requested content, and select a streaming server from among the plurality of streaming servers using said data structure, in response to receiving from the client device a request that identifies the content and a type of said content, said type corresponding to one of a plurality of different streaming server loads, wherein the selecting includes identifying one or more streaming servers of the plurality of streaming servers storing the content identified in the client request, and selecting the streaming server of the plurality of streaming servers among said one or more streaming servers of the plurality of streaming servers having capacity to handle said request by:

identifying the streaming server of the plurality of streaming servers having a lowest connection load that is less than a predetermined connection load threshold, said connection load being determined from periodic feedback information received by the redirection server from the identified streaming server of the plurality of streaming servers, or by estimating from redirects issued by the redirection server, or by a combination of both;

wherein, if the processing load for said identified streaming server of the plurality of streaming servers is less than a predetermined processing load threshold, selecting the streaming server of the plurality of streaming servers to stream the content;

communication means configured to receive said request and to send to the client device a reply including the identifier of the selected streaming server of the plurality of streaming servers;

the redirection server being configured to update the data representing streaming server load associated with the selected streaming server identifier stored in the data structure, in response to selecting the streaming server of the plurality of streaming servers.

20. A redirection server according to claim 19, wherein said type is identified by a type identifier that is specific to said type.

21. A redirection server according to claim 20, wherein said type identifier is associated with one or more of screen aspect ratio and video bit rate.

22. A redirection server according to claim 19, wherein the redirection server is configured to receive from each of the plurality of streaming servers a message including information indicating the current load, and to update the corresponding current load in said data structure based on said information.

23. A redirection server according to claim 19, wherein said connection load limit is based on a benchmarked load.

24. A redirection server according to claim 19, wherein said data structure is configured to store and associate cached content identifiers with said streaming server identifiers, and wherein said selecting means is configured to select the streaming server identifier further based on said cached content identifiers.

25. A redirection server according to claim 19, wherein said selecting means is configured to update said data representing said streaming server loads according to a calculated load value that is a function of processing load and connection load.

26. A redirection server according to claim 25, wherein the function comprises a processing load component, a connection load component, and a connection load to processing load ratio component.

27. A redirection server according to claim 25, wherein the processing load and connection load are weighted such that each load type is assigned a relative importance.

28. A redirection server according to claim 19, including mapping means configured to map said request for content to the one or more streaming server identifiers, from which the streaming server identifier is selected.

29. A redirection server according to claim 19, wherein said data structure is configured to store and associate client identifiers with the selected streaming server identifiers.

30. A method of redirecting a client device to a streaming server of a system including a plurality of streaming servers configured to store content, the method being implemented in a redirection server and comprising the steps of:

periodically monitoring the plurality of streaming servers;

storing and associating streaming server identifiers with data representing streaming server loads including a connection load and a processing load for each of the plurality of streaming servers in a data structure in the redirection server, said connection load being a number of open connections being supported by each streaming server of the plurality of streaming servers for respective content and said processing load being CPU usage for each streaming server of the plurality of streaming servers, wherein said data comprises a current load and a load limit for each of said streaming servers of the plurality of streaming servers, wherein said data structure is configured to store and associate said streaming server identifiers with identifiers of the content residing at the plurality of streaming servers;

receiving from the client device a request that identifies content and a type of said content, said type corresponding to one of a plurality of different streaming server loads;

selecting a streaming server from among the plurality of streaming servers using said data structure, including identifying one or more streaming servers of the plurality of streaming servers storing the content identified in the client request, and selecting the streaming server of the plurality of streaming servers among said one or more streaming servers of the plurality of streaming servers having capacity to handle said request by:

identifying the streaming server of the plurality of streaming servers having a lowest connection load that is less than a predetermined connection load threshold, said connection load being determined from periodic feedback information received by the redirection server from the identified streaming server of the plurality of streaming servers, or by estimating from redirects issued by the redirection server, or by a combination of both;

wherein, if the processing load for said identified streaming server of the plurality of streaming servers is less than a predetermined processing load threshold, selecting the streaming server of the plurality of streaming servers to stream the content;

sending to the client device a reply including the identifier of the selected streaming server of the plurality of streaming servers; and updating the data representing streaming server load associated with the selected streaming server identifier stored in the data structure, in response to selecting the streaming server of the plurality of streaming servers.

31. A method according to claim 30, wherein said type is identified by a type identifier that is specific to said type.

32. A method according to claim 31, wherein said type identifier is associated with one or more of screen aspect ratio and video bit rate.

33. A method according to claim 30, further comprising receiving from each of the plurality of streaming servers a message including information indicating the current load, and updating the corresponding current connection data in said data structure based on said information.

34. A method according to claim 30, wherein said connection load limit is based on a benchmarked load.

35. A method according to claim 30, further comprising:
storing and associating cached content identifiers with said streaming server identifiers; and
wherein said selecting is further based on said cached content identifiers.

36. A method according to claim 30, wherein said updating comprises calculating a load value that is a function of processing load and connection load.

37. A method according to claim 36, wherein the function comprises a processing load component, a connection load component, and a connection load to processing load ratio component.

38. A method according to claim 37, further comprising weighting the processing load and connection load such that each load type is assigned a relative importance.

39. A method according to claim 30, further comprising mapping said request for content to the one or more streaming server identifiers, from which said selecting is performed.

40. A method according to claim 30, further comprising storing and associating client identifiers with the selected streaming server identifiers.

41. A system comprising:
a plurality of streaming servers each configured to retrieve and/or store content for streaming to client devices; and
a redirection server for redirecting the client devices to the plurality of streaming servers in accordance with claim 1.

42. A system according to claim 41, comprising at least two redirection servers for redirecting the client devices to the plurality of streaming servers in accordance with claim 1, the at least two redirection servers sharing an IP address.

43. A system comprising:
a plurality of first apparatuses for redirecting client devices to a plurality of streaming servers in accordance with the redirection servers of claim 1; and
a second apparatus for redirecting the client devices to one of said plurality of first apparatuses.

44. A system of claim 43 wherein the second apparatus is configured to redirect said request to a first apparatus among the plurality of first apparatuses that is geographically located closest to the client device sending the request.

45. A system of claim 44 wherein said second apparatus is configured to determine the difference between an IP address of the client device and an IP address of each of the plurality of first apparatuses and identify a lowest absolute value.

46. A non-transitory carrier medium carrying computer readable code for configuring a computer as the redirection server of claim 1.

47. A non-transitory carrier medium carrying computer readable code for controlling a computer to carry out the method of claim 10.

48. A system comprising:
a plurality of streaming servers each configured to retrieve and/or store content for streaming to client devices; and
a redirection server for redirecting the client devices to the plurality of streaming servers in accordance with claim 19.

49. A system according to claim 48, comprising at least two redirection servers for redirecting the client devices to the plurality of streaming servers in accordance with claim 19, wherein the at least two redirection servers share an IP address.

50. A system comprising:
a plurality of first apparatuses for redirecting client devices to a plurality of streaming servers in accordance with the redirection servers of claim 19; and
a second apparatus for redirecting the client devices to one of said plurality of first apparatuses.

51. A system according to claim 50, wherein the second apparatus is configured to redirect said request to a first apparatus among the plurality of first apparatuses that is geographically located closest to the client device sending the request.

52. A system according to claim 51, wherein said second apparatus is configured to determine the difference between an IP address of the client device and an IP address of each of the plurality of first apparatuses and identify a lowest absolute value.

53. A non-transitory carrier medium carrying computer readable code for configuring a computer as the redirection server of claim 19.

54. A non-transitory carrier medium carrying computer readable code for controlling a computer to carry out the method of claim 30.

* * * * *